United States Patent [19]

Meyer et al.

[11] Patent Number: 4,911,869

[45] Date of Patent: Mar. 27, 1990

[54] REIMPREGNATION OF PLASTIC FOAM PARTICLES WITH $CO_2$

[75] Inventors: Bernard H. Meyer, Newtown Square; Joseph C. Kinslow, Media, both of Pa.

[73] Assignee: Arco Chemical Technology, Inc., Wilmington, Del.

[21] Appl. No.: 256,006

[22] Filed: Oct. 11, 1988

[51] Int. Cl.[4] ............................................. B29D 67/20
[52] U.S. Cl. ....................................... 264/50; 264/51; 264/53
[58] Field of Search .................................... 264/50, 53

[56] References Cited

U.S. PATENT DOCUMENTS

| | | | |
|---|---|---|---|
| 2,531,665 | 11/1950 | Booth | 18/48 |
| 2,714,747 | 8/1955 | Lindemann et al. | 264/50 |
| 2,714,748 | 8/1955 | Stirnemann et al. | 264/50 |
| 2,751,627 | 6/1956 | Lindemann | 264/50 |
| 2,768,407 | 10/1956 | Lindemann | 264/50 |
| 2,848,427 | 8/1958 | Rubens | |
| 3,243,485 | 3/1966 | Griffin | 264/51 |

OTHER PUBLICATIONS

*Concise Chemical and Technical Dictionary,* Fourth Enlarged Edition edited by H. Bennett, New York, Chemical Publishing Co., Inc., c 1966, p. 916.

Primary Examiner—Hubert C. Lorin
Attorney, Agent, or Firm—Lewis J. Young

[57] ABSTRACT

The process of making foam moldings without the use of organic blowing agents involves the use of inorganic gases such as carbon dioxide, nitrogen, air, solid carbon dioxide and other pneumatogens. Because of the rapidity with which these gases diffuse out of the polymer particles, it is necessary to pre-expand the particles and then reimpregnate the particles with the same or different gas.

8 Claims, 1 Drawing Sheet

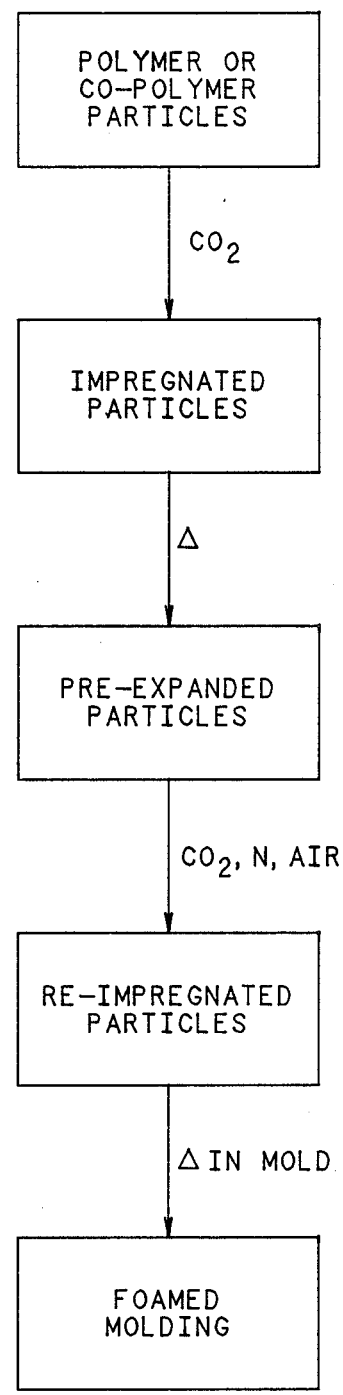

REIMPREGNATION OF PLASTIC FOAM PARTICLES WITH CO$_2$

BACKGROUND OF THE INVENTION:

The present invention is directed to a method of impregnating and reimpregnating polystyrene, styrene copolymers, polymethyl methacrylate, methyl methacrylate copolymers, crosslinked variations thereof and interpenetrating networks thereof with carbon dioxide or other pneumatogens.

The preparation of molded foamed plastic articles is well known wherein plastic particles are impregnated with organic blowing agents, expanded to preliminary low density particles, placed into a mold and finally expanded to the desired fully expanded article. The most used organic blowing agent is n-pentane. Unfortunately, n-pentane is now considered to be hazardous in the quantities which are removed during the molding. Further, the residual pentane in the molded parts continues to escape into the atmosphere for an extended time after removal of the part from the mold.

To eliminate this problem, various inorganic blowing agents such as carbon dioxide, nitrogen, air, dry ice and other pneumatogens have been tried.

U.S. Pat. No. 2,531,665 teaches to impregnate polymers at 100°–125° C. with inert gas under pressure followed by cooling and reheating in a mold to bring about expansion.

U.S. Pat. No. 2,848,427 teaches to impregnate polystyrene crosslinked with 0.01–0.25% DVB with CO$_2$ under pressure at a temperature below the Tg until at least 2% CO$_2$ was absorbed.

U.S. Pat. No. 3,243,485 teaches to impregnate films or sheets of polystyrene in dry ice.

None of these patents teaches to mold low density foam articles by re-impregnating the expanded particles with CO$_2$ or any other pneumatogen.

BRIEF SUMMARY OF THE INVENTION

We have now found that in cases where the blowing agent is depleted by the pre-expansion step, the particles can be re-impregnated by contacting the particles with gas, liquid, or solid carbon dioxide, air or other inorganic blowing agents for a time sufficient to accomplish the impregnation.

BRIEF DESCRIPTION OF THE DRAWING:

The drawing is a flow diagram of the process of the invention.

DETAILED DESCRIPTION OF THE INVENTION:

The process of this invention relates to the molding of foams from polymer particles containing inorganic gases as blowing agents.

The polymer particles suitable for the process may be polystyrene, styrene copolymers, polymethyl methacrylate, methyl methacrylate copolymers, cross-linked variations thereof and interpenetrating networks thereof. Particularly suitable copolymers of styrene are those copolymers with from 5 to 35 mole percent of maleic anhydride and its derivatives such as the imide, N-alkylimide, N-phenylimide, esters, half acids and half esters. Other suitable copolymers are styreneacrylonitrile, acrylonitrile-butadiene-styrene, styrene-methyl methacrylate, and the rubber modified high impact styrene copolymers.

The inorganic gases useful as blowing agents may be nitrogen, air, gaseous, liquid, or solid carbon dioxide and other pneumatogens. As is known, when these agents are used as blowing agents for the named polymers, the agent escapes exceedingly fast from the polymer particles even at room temperature, and after pre-expansion, the particles no longer contain enough blowing agent to allow the particles to be further expanded during the molding process. It is therefore necessary to reimpregnate the particles with the same or a different gas. In the case of carbon dioxide, the polymer need only be allowed to stand in the presence of dry ice powder or nuggets for times from 1 hour to 2 days. Compressed air (30 psig) has been used successfully for the reimpregnation.

The use of these inorganic gases or their pneumatogens eliminates the objections encountered when the organic hydrocarbon blowing agents are used. Thus, no toxic fumes are given off during the molding cycles. Further, there are no residual vapors given off by the moldings after removal from the mold. Although not completely satisfactory, combinations of hydrocarbon and CO$_2$ may also be used.

The following examples are meant to further illustrates the invention, but not to limit the claims.

EXAMPLE I

Three hundred grams of polystyrene beads having a weight average molecular weight of 300,000 (0.4 mm diameter) were mixed with 1200 g of dry ice nuggets for a minimum of 24 hr or until the carbon dioxide in the beads reached 6 wt-% or more. The beads were then removed from the dry ice and immediately expanded in a steam autoclave (20 psig external and 25 psig internal) for 5–10 sec. The resultant puff had a density of 6–7 pcf.

The pre-puff from the above were molded into cups after varying times in dry ice. The fusion of the molded articles were rated and recorded in Table I.

TABLE I

| Treatment | Fusion |
| --- | --- |
| None | Poor |
| 1 Day in dry ice | Good |
| 1 Day in air (30 psig) | Good |

It can be seen from the data in Table I that when the beads were pre-puffed, the CO$_2$ was completely dissipated and the moldings were not fused. Reimpregnation of the pre-expanded beads allowed the reimpregnated beads to be molded into parts having reasonable fusion of the beads. The use of air instead of dry ice for the reimpregnation is also illustrated.

EXAMPLE II

Three hundred grams of polystyrene beads having a weight average molecular weight of 200,000 (0.8 mm diameter) were mixed with 1200 g of dry ice nuggets for a minimum of 24 hr or until the carbon dioxide in the beads reached 6 wt-% or more. The beads were then removed from the dry ice and immediately expanded in a steam autoclave (20 psig external and 25 psig internal) for 5–10 sec. The resultant puff had a density of 2–3 pcf.

The pre-puff from the above were molded after varying times in dry ice. The density and percent fusion of the molded article were measured and recorded in Table II.

TABLE II

| Treatment | Density (pcf) | Fusion (%) |
| --- | --- | --- |
| None | 2.44 | 1.00 |
| 2 hours in dry ice | 2.29 | 25.00 |
| 4 hours in dry ice | 2.28 | 15.00 |
| 2 days in dry ice | 2.46 | 14.00 |

It can be seen from the data in Table II that when the beads were pre-puffed, the $CO_2$ was completely dissipated and the moldings were not fused. Reimpregnation of the pre-expanded beads allowed the reimpregnated beads to be molded into parts having reasonable fusion of the beads.

We claim:

1. A process for foaming styrene polymers and copolymers, polymethyl methacrylate, methyl methacrylate copolymers, cross-linked variations thereof and interpenetrating networks thereof comprising the steps of
   (a) impregnating particles of the polymer or copolymer with carbon dioxide for at least 1 hour to obtain 1-25% 25% carbon dioxide absorption;
   (b) expanding these particles at a temperature above the glass transition temperature of the polymer-carbon dioxide blend;
   (c) reimpregnation of the expanded particles in air, nitrogen, gaseous carbon dioxide, or in the presence of liquid or solid carbon dioxide or other pneumatogens; and
   (d) molding said reimpregnated expanded particles by heating in foam molding machines.

2. The process of claim 1 wherein the styrene polymer is polystyrene.

3. The process of claim 1 wherein the styrene copolymer is a styrene-maleic anhydride copolymer containing 5 to 35 mole-% maleic anhydride.

4. The process of claim 1 wherein the styrene copolymer is a styrene-acrylonitrile copolymer.

5. The process of claim 1 wherein the styrene copolymer is an acrylonitrile-butadiene-styrene copolymer.

6. The process of claim 1 wherein the styrene copolymer is a styrene-methyl methacrylate copolymer.

7. The process of claim 1 wherein the styrene copolymer is a high impact rubber modified polystyrene.

8. The process of claim 1 wherein the reimpregnation is accomplished with a mixture of carbon dioxide and a minor amount of hydrocarbon blowing agent.

* * * * *

UNITED STATES PATENT AND TRADEMARK OFFICE
CERTIFICATE OF CORRECTION

PATENT NO. : 4,911,869

DATED : March 27, 1990

INVENTOR(S) : Bernard H. Meyer and Joseph C. Kinslow

It is certified that error appears in the above—identified patent and that said Letters Patent is hereby corrected as shown below:

Column 3, line 26, delete second "25%"

Signed and Sealed this

Nineteenth Day of November, 1991

Attest:

HARRY F. MANBECK, JR.

Attesting Officer

Commissioner of Patents and Trademarks